Jan. 18, 1927.

K. KOVARIK

BELT FASTENER

Filed June 12, 1926

1,615,176

Patented Jan. 18, 1927.

1,615,176

UNITED STATES PATENT OFFICE.

KARL KOVARIK, OF VIENNA, AUSTRIA, ASSIGNOR TO HUGO ROSENTHAL, OF VIENNA, AUSTRIA.

BELT FASTENER.

Application filed June 12, 1926, Serial No. 115,632, and in Austria June 19, 1925.

Belt-fasteners are already known, in which the ends of the driving belt are connected together by pliant links consisting for instance of leather, whereby the ends of the said links are formed into loops and passed through transverse slits of the ends of the driving belt and secured by split-pins. These belt-fasteners possess the drawback, that in consequence of the slight resistance of the said links the driving belt can be subjected only to a part of the tensile strain to which the belt otherwise could be subjected.

Further belt-fasteners are already known, in which the ends of the driving belt, lying on top of each other with the working faces, are pressed against pins or cotters by the working pressure, whereby the said pins or cotters rest in strips of sheet-metal, pushed through longitudinal slits in the ends of the driving belt. Owing to the small friction between like materials the pins or cotters easily drop out of the sheet-metal strips in case of variations in the strain and therefore are a danger to the satisfactory operation.

The present invention is an improvement of the belt-fastener last mentioned and essentially consists in that the pins or cotters are located in edgewise disposed connecting links of a pliant material, whereby the said pins or cotters cannot drop out owing to the increased friction between different materials. A further advantage of the present invention consists in that, in spite of great strength, the individual connecting links adapt themselves readily to all curvatures of the belt pulley, so that the load is uniformly distributed to the individual connecting links.

One mode of carrying out the present invention is illustrated by way of example on the accompanying sheet of drawings in which—

Figure 1:
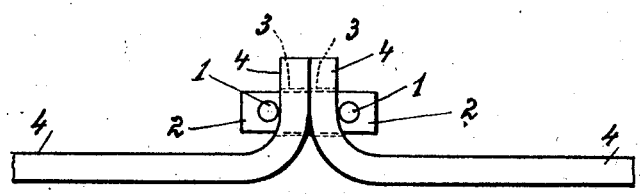
Figure 2:
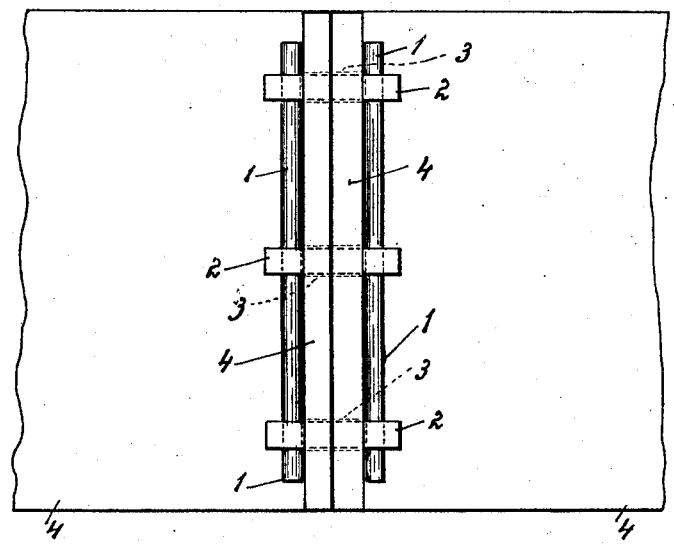

Figs. 1 and 2 show a belt-fastener, connecting the ends of a driving belt, in front view and plan view respectively.

The belt-fastener consists of strips 2 of a pliant material, preferably driving belt leather or skin, which are edgewise disposed and passed through longitudinal slits 3 of the ends 4 of the driving belt, the working faces of the said ends resting against each other. The pins or cotters 1 are pushed through holes in the strips 2. During the working, the strips are stretched until the force is uniformly distributed over the pins or cotters 1 and the individual strips 2, whereby also the crowning and curvature of the belt-pulley is taken into consideration. The pins or cotters 1 cannot drop out owing to the great friction between the unlike materials and because the holes for the pins 1 are cut through the texture of the leather-strips 2.

I claim—

A belt having two meeting ends turned outwardly at an angle of approximately 90° with respect to the general plane of the belt and provided with openings arranged longitudinally of the belt and extending through the same near its ends, strips of pliant material extending through said openings and connecting the ends of the belt and pins arranged parallel with the outwardly turned ends of the belt, bearing on the outer sides thereof and extending through openings in and connecting said strips of pliant material.

In testimony whereof I affix my signature.

KARL KOVARIK.